INVENTOR.
Rudolph Daub
BY
Frank A. Bower
ATTORNEY

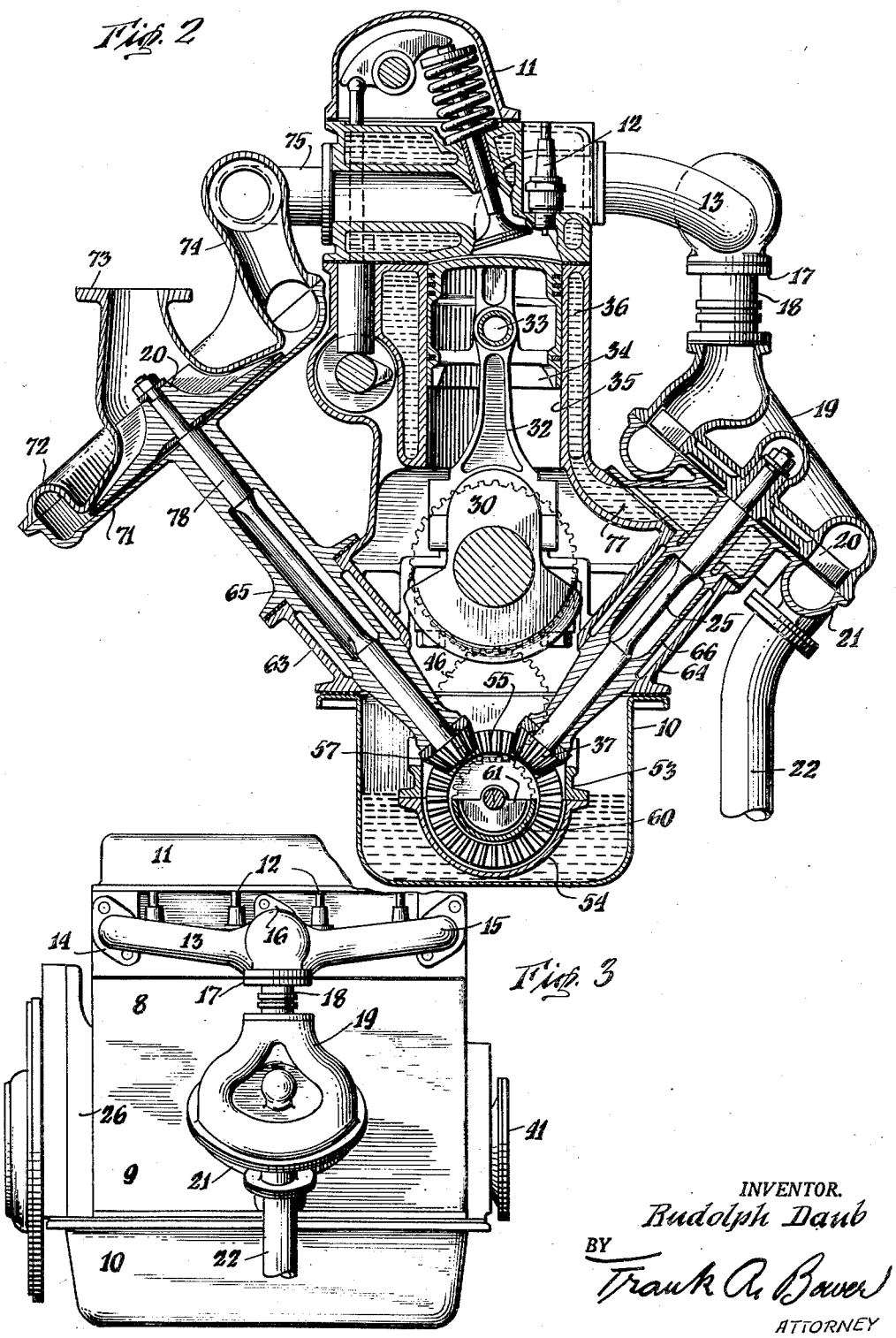

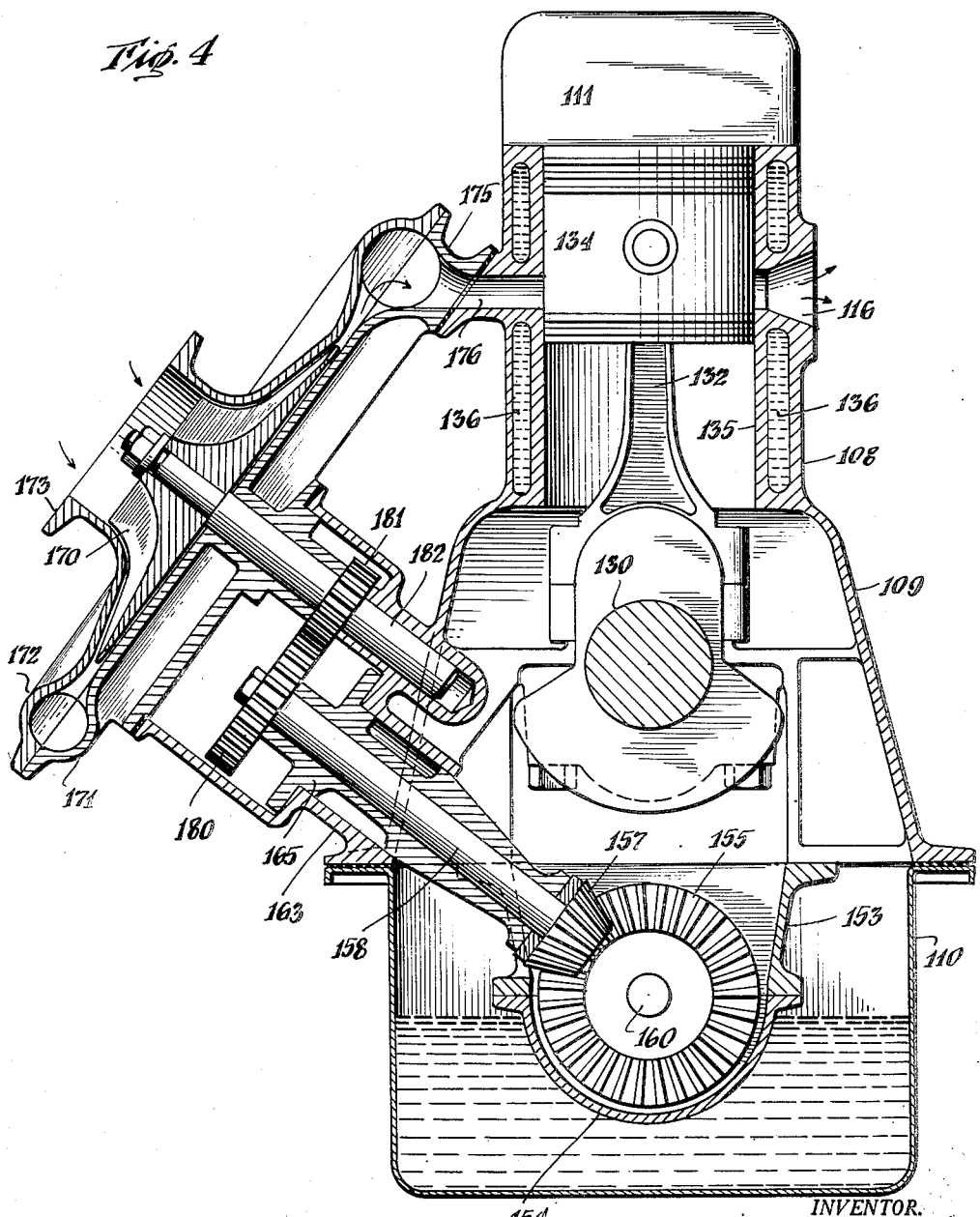

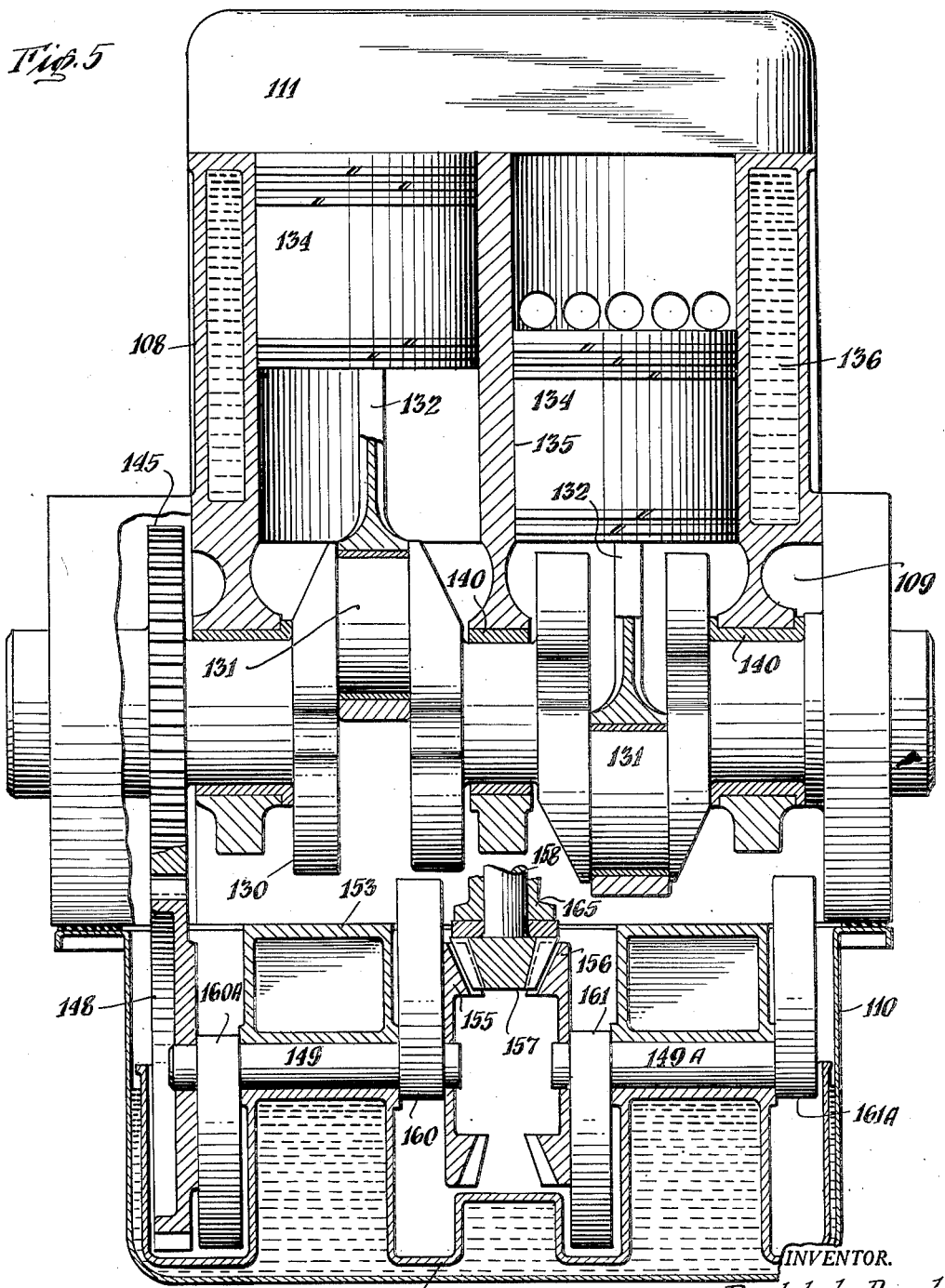

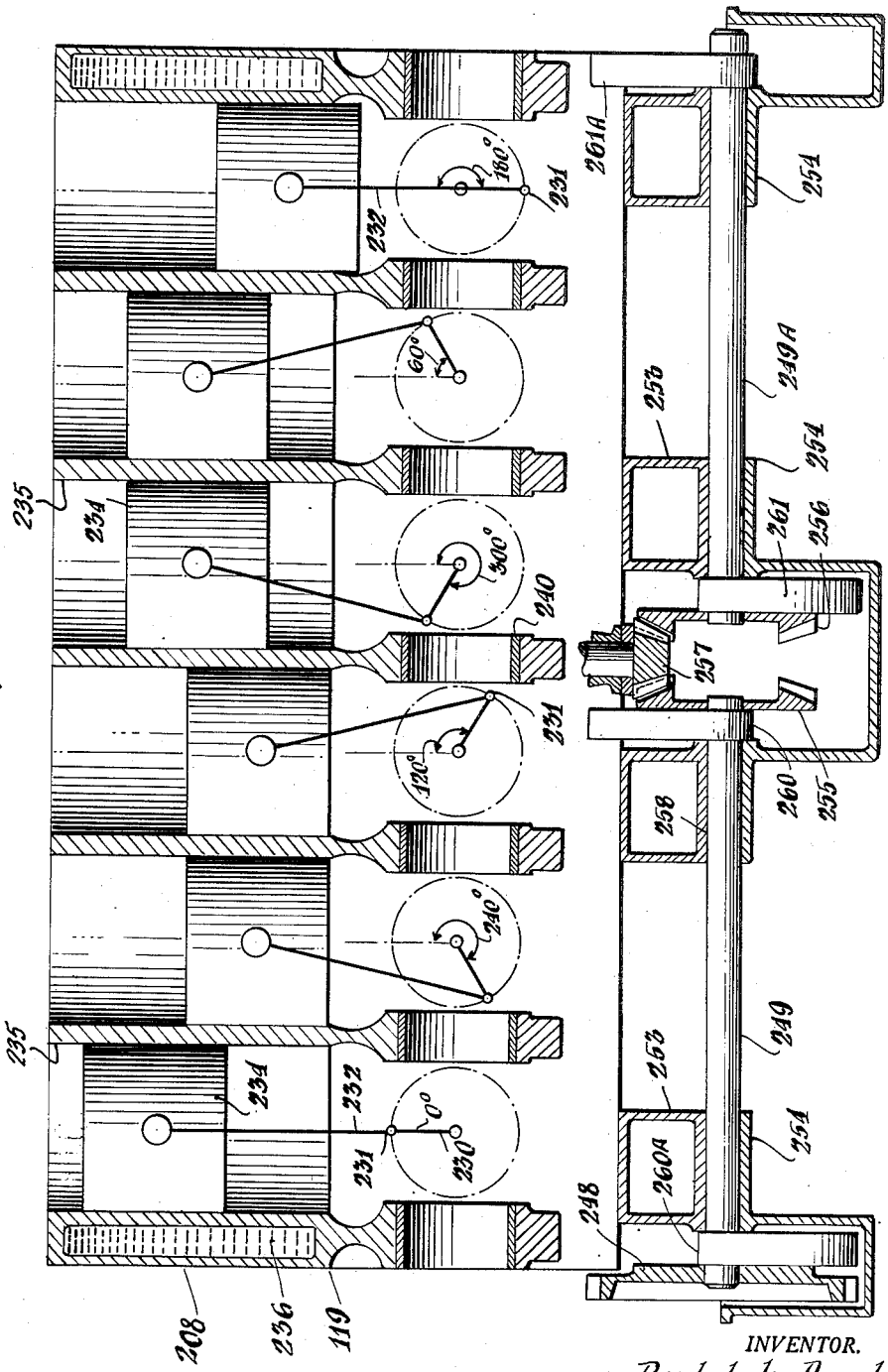

Patented Sept. 14, 1954

2,688,839

UNITED STATES PATENT OFFICE 2,688,839

INTERNAL-COMBUSTION ENGINE WITH AUXILIARY EXHAUST TURBINE

Rudolph Daub, West Caldwell, N. J.

Application December 31, 1948, Serial No. 68,620

6 Claims. (Cl. 60—13)

This invention relates to internal combustion engines and particularly to such engines of the in-line type.

The object of the invention is to provide an in-line internal combustion engine which will be smooth-running and efficient giving even, vibrationless performance equaling or exceeding that of larger engines of greater weight and cost.

Further objects of the invention, particularly in the dynamic balancing of the engine and supercharging the intake and compounding the power by an exhaust driven turbine will appear from the following description taken in connection with the accompanying drawings illustrating the invention and in which Fig. 1 is a transverse vertical sectional view of the engine shown in Figs. 2 and 3;

Fig. 2 is a longitudinal vertical sectional view of an engine having four cylinders in upright position;

Fig. 3 is a side elevational view in outline of the engine shown in Figs. 1 and 2;

Figs. 4 and 5 are transverse and longitudinal vertical sectional views respectively of a modified form of engine; and Fig. 6 is a longitudinal vertical sectional view of another form of engine.

Figure 1:
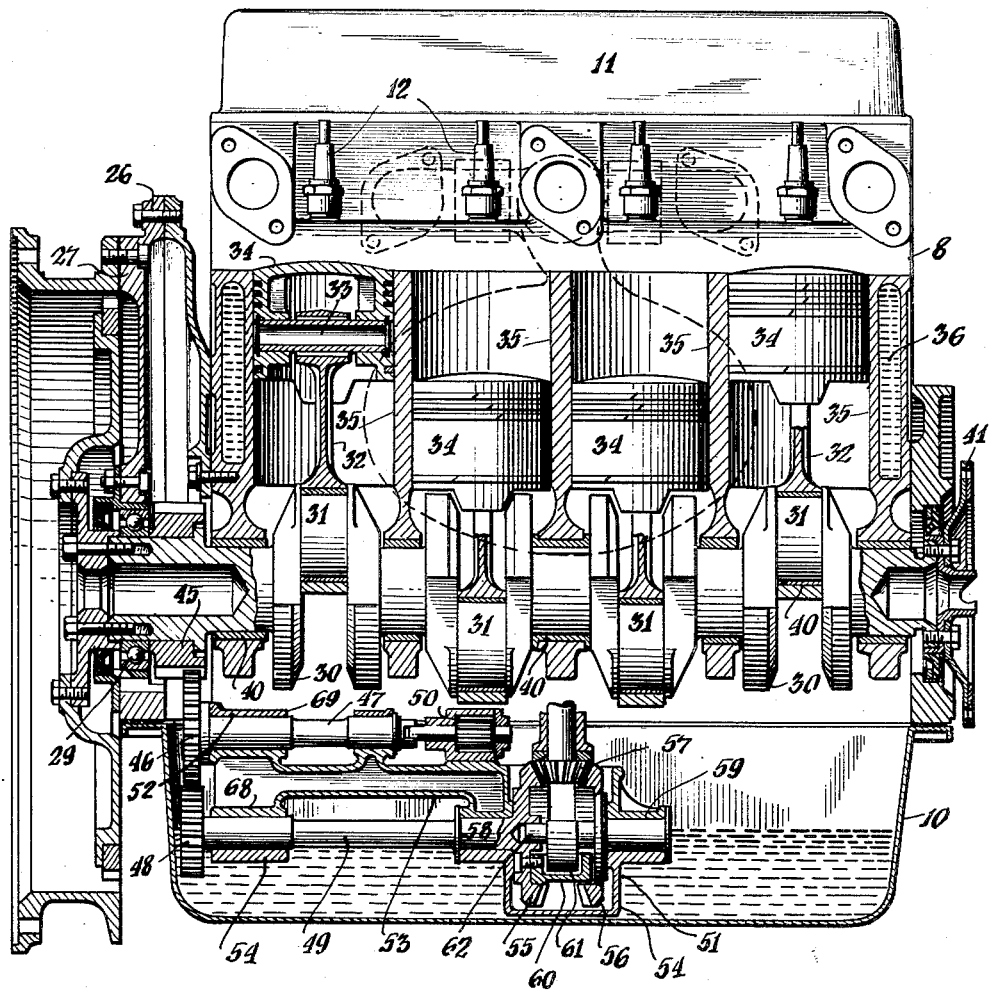

The invention as illustrated in Figs. 1-3 shows an upright engine comprising four cylinders which may be cast together in a block 8 and with a crankcase 9 and oil can 10 and separate top valve housing 11 (Fig. 1). The spark plugs are shown at 12 and the exhaust manifold 13 has its ends receiving the exhaust gases from the end ports 14, 15 from the end cylinders and at the center from the exhaust port 16 from the intermediate cylinders. A coupling 17 carries the connection section 18 leading to the spiral intake casing 19 of a gas turbine having the rotor 20 on shaft 25 and exhausting into the discharge chamber 21 passing the gases at reduced pressure into the exhaust pipe 22. This exhaust chamber 21 may be of a spiral formation similar to that of the intake 19. At the rear the engine block carries the casting 26 with rim portion 27 for attachment, for instance, to the transmission and clutch casing of a motorcar and also attached to the casing 26 is the outer ring structure of the crankshaft bearing 29 for the crankshaft 30 having the engine block bearings 40 distributed along its length. Each crankpin 31 is connected by a short connecting rod 32 to the wristpin 33 of the corresponding piston 34 in its cylinder 35, a water jacket being provided as shown at 36.

The rear end of the crankshaft 30 carries a gear 45 meshing with a gear 46 of countershaft 47, this latter gear 46 in turn meshing with the gear 48 of countershaft 49, gear 48 being half the diameter of gear 46 so that countershaft 49 rotates at double the speed of crankshaft 30. Countershaft 47 is adapted to drive an engine accessory such, for instance, as an oil pump 50 and countershaft 49 drives the dynamic balancer indicated generally at 51. All of these parts are carried by a casing 52, 53, 54 rigidly supported from the crankcase.

The dynamic balancer includes the bevel gear 55 of countershaft 49 and bevel gear 56 driven from gear 55 through pinion means such as 57, the shafts of these gears 55, 56 running in bearings 58, 59 respectively. To give the proper balance to the engine gear 55 carries the semicircular weight 60 pinned to it as indicated and gear 56 carries the segmental weight 61, the stub shaft 62 of which runs in the central bearing of gear 55. These weights thus rotate in opposite directions around a common axis parallel to the axis of the crankshaft and in the plane of the axes of the crankshaft and cylinders, their rate of rotation being twice that of the crankshaft 30. By properly designing these weights 60, 61, the four-cylinder engine shown may be very closely balanced against vibrational effects of the rotary parts so that it will run smoothly.

The gears 55, 56 of the balancer may also be used to connect the crankshaft to engine accessories such as the exhaust gas turbine previously referred to and the centrifugal supercharger for the intake on the opposite side of the engine (Fig. 1). This supercharger and the gas turbine are supported in extensions 63, 64 respectively of the crankcase 9 housing the tubular structures 65, 66 through which pass the shafts 78 and 25 respectively of the supercharger and turbine. The turbine rotor 20 through the shaft 25 drives the bevel pinion 37 meshing with the gears 55, 56 and similarly the pinion 57 meshing with these gears drives the supercharger rotor 20 through the shaft 78. The housing of the supercharger is formed by the expanded portion 71 of the tubular member 65 and by the intake casting 72 coupled at 73 to a supply of gas from the carburetor and passing these intake gases at higher pressure through the connector 74 to the manifold 75. The rotors of the exhaust turbine and the supercharger revolve at relatively high speeds of the order of 20,000 R. P. M. at normal engine speed of 3,000 R. P. M.

In operation the exhaust turbine rotor 20 at usual speeds of the engine delivers power to the shaft 78 in the range of 10% to 20% of the rated horsepower of the engine so that the torque of the gas turbine is applied to the gears 55, 56 to drive the balancer and power is delivered through the gear 57 to the shaft 78 and the rotor 70 of the supercharger. The excess power of the exhaust turbine delivered to the gears 55, 56 is transmitted through shaft 49 to the gears 48, 46 and eventually to 45 depending upon the power consumption of the accessories between the gas turbine rotor and the crankshaft 30. The timing of the balancer gears 55, 56 is, of course, precisely double that of the crankshaft as determined by these gears 45, 46 and 48 and at lower speeds and lower power output of the exhaust turbine rotor, power to drive the balancer 51 will be provided by the crankshaft through these gears.

The engine thus comprises a plurality of in-line cylinders with relatively short connecting rods to the crankshaft and provided with a balancer including members oppositely rotating around a single axis intersecting a radius from the center of the axis of the crankpin bearing 2. The axis of the balancer members shown is also in the plane of the axes of the crankshaft and cylinders. The drawings, Figs. 1–3, are to scale representing a four-cylinder engine with a cylinder bore of $3\frac{7}{16}$ inches and other parts in proportion.

Another typical four-cylinder, four-cycle engine of this invention having a cylinder bore of 3.750 inches and a stroke of 2.875 inches allows the use of correspondingly large valves and valve ports tending to free breathing and in addition may be under supercharger pressure as shown, with the agitating effect causing the fuel to be broken up into a fine mist thoroughly and homogeneously intermixed with the air so as to be readily ignitable even in relatively lean proportions. The short stroke of 2.875 inches keeps the piston speed for 3,600 R. P. M. within the limit of 1800 feet per minute, and also lowers the compression ratio to 6.22:1 consistent with the larger charge supplied by the supercharging. The supercharger assembly is accessible for easy removal and replacement as is also the exhaust turbine.

Structurally the engine is compact and its reciprocating masses light as compared with the usual four-cylinder in-line engine of similar bore and stroke which conventionally has a long connecting rod to minimize the unbalance.

The two-cycle engine shown in Figs. 4 and 5 has two in-line cylinders in block 108 water jacketed at 136 and having crankcase 109 and oil pan 110 and cap casing 111. The crankshaft 130 running in bearings 140 has its crankpins connected by short connecting rods 132 to pistons 134 in cylinders 135 provided with intake ports 176 and exhaust ports 116 controlled by the pistons 134 of the respective cylinders. Gear 145 driven by the crankshaft 130 meshes with gear 148 of like diameter fixed on shaft 149 of the dynamic balancer located in the oil pan 110 below the crankshaft. Balancing members 160, 160A carried by shaft 149 have their centers of gravity 180° apart as shown and shaft 149 carries bevel gear 155 and, through pinion means 157, drives the cooperating shaft 149A carrying the balancing members 161, 161A corresponding respectively to members 160A and 160 of shaft 149. The shafts 149 and 149A are coaxial with their axis in the plane of the axes of the cylinders 35 and crankshaft 130. The balancing device as a whole is shown as centered with reference to the center crankshaft bearing 140 and is supported in the casing structure 153, 154 from the crankcase 109.

Preferably the pinion 157 is used to drive an engine accessory such, for instance, as the centrifugal supercharger shown (Fig. 4), the crankcase structure being correspondingly formed as shown at 163 to house the drive members and support the supercharger casing members 171, 172. Pinion 157 drives shaft 158 running in tubular bushing 165 and carrying gear 180 driving gear 181 of shaft 182 to which is fixed the rotor 170 of the supercharger. The air and gas mixture is received at the coupling 173 connected to the supply and is stepped up in pressure and delivered through dischargers 175 to the intakes 176 of the cylinders.

The balancing of the reciprocating parts employs members 160, 160A, 161 and 161A whose torque effect counterclockwise, for instance (Fig. 5), counterbalances the unbalanced clockwise torque of the connecting rods and pistons.

Similarly the torques of the reciprocating parts of the six-cylinder, two-cycle engine outlined in Fig. 6 are dynamically balanced by the weights 260A, 260, 261 and 261A on shafts 249, 249A driven through gear 248 at the same speed as the crankshaft 230 in bearings 240. The pistons 234 in cylinders 235 of block 208 are connected by rods 232 to crankpins 231, the relative angularities of which are shown in the drawing. The effect of the reciprocating parts is to create movements clockwise and counterclockwise around the center giving rise to corresponding torques which must be balanced for smoothness of operation. In the engine shown shaft 249 drives shaft 249A in the opposite direction through gears 255, 257, 256, the balancing device as a whole being mounted in casing members 253, 254 fastened to the crankcase 119.

The balancing weights for the engines may be closely calculated to give substantially vibrationless operation. Assuming, for instance, in the engine of Figs. 1–3, pistons of about 3 inch diameter having a weight of about one pound each and adding thereto the weights of the upper end of the connecting rod, the total reciprocating weight for each cylinder would be one and one-quarter pounds. The secondary shaking force for the four-cylinder engine would be 760 pounds requiring two weights 60, 61 of one-half pound each on a radius of one-half inch. Similarly the weight of the masses to balance the six-cylinder, two-cycle engine of Fig. 6 would be three and one-half pounds centered on a radius of two inches. For the two-cycle, two-cylinder engine of Figs. 4 and 5 the weights would be almost the same; the different balancing effort as compared with the six cylinders would be compensated for by different distances between the weights varying the resulting torques to accurate balancing of the engine.

I claim:

1. A four-cycle, four-cylinder internal combustion engine comprising pistons driving a crankshaft, a pair of bevel gears with cooperating pinion means between them in a plane midway between the ends of the engine, a dynamic balancing device having a pair of coaxial oppositely rotating members carried respectively by said bevel gears to rotate therewith adjacent said plane and having their common center of gravity always in said plane midway between the ends of the engine, and means for driving said bevel gears from said crankshaft at double the speed thereof.

2. An internal combustion engine as set forth in claim 1 in which a turbine driven by the exhaust of said engine is connected to said pinion means to deliver power to said bevel gears.

3. An internal combustion engine as set forth in claim 1 in which a rotary supercharger for raising the pressure of the intake gases for the engine is connected to said pinion means to be driven by said bevel gears.

4. An internal combustion engine as set forth in claim 1 in which a gas turbine driven by the exhaust from said engine and a rotary supercharger for raising the pressure of the intake to said engine are connected to said pinion means respectively to deliver power and receive power therefrom.

5. An internal combustion engine comprising a series of cylinders having parallel axes, pistons in said cylinders driving a crankshaft having its axis in the plane of said cylinder axes, a countershaft parallel to and driven from said crankshaft, coaxial bevel gear means driven by said countershaft at double the crankshaft speed and having pinions meshing with said gear means, a gas turbine at one side of the engine receiving power from the engine exhaust from said cylinders and connected to drive said gear means through one of said pinions, and a supercharger at the other side of the engine connected to the other of said pinions to be driven from said gear means and deliver power to raise the pressure for the intake gases for the engine.

6. An internal combustion engine as set forth in claim 5 in which the bevel gear means carry on separate gears a dynamic balancing device rotating about a common axis parallel to the axis of the engine crankshaft, said dynamic balancing device having members with their common center of gravity always in a transverse plane midway between the ends of the engine.

References Cited in the file of this patent

UNITED STATES PATENTS

| Number | Name | Date |
|---|---|---|
| 1,163,832 | Lanchester | Dec. 14, 1915 |
| 1,984,958 | Barske | Dec. 18, 1934 |
| 2,127,460 | Chilton | Aug. 16, 1938 |
| 2,149,785 | Neugebauer | Mar. 7, 1939 |
| 2,248,182 | Mateer | July 8, 1941 |
| 2,284,515 | Criswell | May 26, 1942 |
| 2,359,065 | Waeber | Sept. 26, 1944 |
| 2,428,924 | Albertson | Oct. 14, 1947 |